United States Patent
Inoue et al.

(10) Patent No.: US 11,402,098 B2
(45) Date of Patent: Aug. 2, 2022

(54) GAS TURBINE COMBUSTOR AND GAS TURBINE

(71) Applicant: Mitsubishi Hitachi Power Systems, Ltd., Kanagawa (JP)

(72) Inventors: Kei Inoue, Tokyo (JP); Kenji Miyamoto, Yokohama (JP); Kenta Taniguchi, Yokohama (JP); Satoshi Tanimura, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 92 days.

(21) Appl. No.: 16/757,885

(22) PCT Filed: Oct. 23, 2018

(86) PCT No.: PCT/JP2018/039311
§ 371 (c)(1),
(2) Date: Apr. 21, 2020

(87) PCT Pub. No.: WO2019/082880
PCT Pub. Date: May 2, 2019

(65) Prior Publication Data
US 2020/0340674 A1  Oct. 29, 2020

(30) Foreign Application Priority Data

Oct. 27, 2017  (JP) .............................. JP2017-208504

(51) Int. Cl.
*F23R 3/28* (2006.01)
*F23R 3/14* (2006.01)
*F02C 7/22* (2006.01)

(52) U.S. Cl.
CPC ................ *F23R 3/286* (2013.01); *F23R 3/14* (2013.01); *F02C 7/22* (2013.01); *F05D 2240/35* (2013.01);
(Continued)

(58) Field of Classification Search
CPC ..... F23R 3/10; F23R 3/14; F23R 3/286; F02C 7/22; F02C 7/228
See application file for complete search history.

(56) References Cited

U.S. PATENT DOCUMENTS 6,141,967 A     11/2000  Angel et al.
6,594,999 B2 *  7/2003   Mandai ..................... F23R 3/14
                                                          60/722
(Continued)

FOREIGN PATENT DOCUMENTS

CN    103080653    5/2013
CN    105051457   11/2015
(Continued)

OTHER PUBLICATIONS

International Search Report dated Dec. 25, 2018 in International (PCT) Application No. PCT/JP2018/039311, with English Translation.
(Continued)

*Primary Examiner* — Craig Kim
(74) *Attorney, Agent, or Firm* — Wenderoth, Lind & Ponack, L.L.P.

(57) ABSTRACT

A gas turbine combustor is equipped with a nozzle in which an air ejection passage extending along an axis and having an open distal end, and a fuel supply passage extending along the axis and having an open distal end are formed; swirling vanes provided around the nozzle so as to be twisted around the axis of the nozzle; an inner cylinder surrounding an outer periphery of the nozzle and the swirling vanes, and in which compressed air flows through an inside of the inner cylinder toward a downstream side; an outer cylinder which defines an inversion flow path, which inverts the compressed air on an outer periphery of the inner cylinder and introduces the compressed air to the inside of the inner cylinder, between the inner and outer cylinders;

(Continued)

and an air introduction pipe having one end connected to a space on an upstream side of the compressed air from the inversion flow path, and the other end connected to the air ejection passage.

9 Claims, 3 Drawing Sheets

(52) U.S. Cl.
CPC ............... *F23C 2900/07001* (2013.01); *F23D 2900/14004* (2013.01)

(56) References Cited

U.S. PATENT DOCUMENTS

| | | | | |
|---|---|---|---|---|
| 6,634,175 | B1* | 10/2003 | Kawata | F23R 3/04 60/746 |
| 6,923,001 | B2* | 8/2005 | Laster | F23R 3/40 431/170 |
| 9,366,438 | B2* | 6/2016 | Rajaram | F23R 3/54 |
| 2001/0020364 | A1* | 9/2001 | Sato | F23R 3/005 60/746 |
| 2007/0199324 | A1 | 8/2007 | Tanimura et al. | |
| 2007/0199327 | A1* | 8/2007 | Tanimura | F23R 3/04 60/740 |
| 2013/0139511 | A1 | 6/2013 | Sometani et al. | |
| 2015/0285503 | A1 | 10/2015 | Li et al. | |
| 2016/0032842 | A1 | 2/2016 | Isono et al. | |
| 2016/0377290 | A1 | 12/2016 | Okazaki et al. | |
| 2017/0130962 | A1 | 5/2017 | Inoue et al. | |
| 2020/0326073 | A1 | 10/2020 | Kim et al. | |

FOREIGN PATENT DOCUMENTS

| | | |
|---|---|---|
| CN | 106287813 | 1/2017 |
| DE | 10 2007 009 285 | 10/2010 |
| DE | 11 2014 001 594 | 1/2016 |
| DE | 11 2017 001 694 | 12/2018 |
| EP | 2698582 | 2/2014 |
| JP | 2000-356315 | 12/2000 |
| JP | 2005-061715 | 3/2005 |
| JP | 2005-195284 | 7/2005 |
| JP | 5524407 | 6/2014 |
| JP | 2015-183892 | 10/2015 |
| JP | 2017-519172 | 7/2017 |
| JP | 2017-180236 | 10/2017 |
| JP | 2017-180267 | 10/2017 |
| WO | 2012/124467 | 9/2012 |

OTHER PUBLICATIONS

Written Opinion dated Dec. 25, 2018 in International (PCT) Application No. PCT/JP2018/039311, with English Translation.

* cited by examiner

GAS TURBINE COMBUSTOR AND GAS TURBINE

TECHNICAL FIELD

The present invention relates to a gas turbine combustor and a gas turbine.

Priority is claimed on Japanese Patent Application No. 2017-208504, filed Oct. 27, 2017, the content of which is incorporated herein by reference.

Background Art

A combustor used in a gas turbine is mainly equipped with a cylinder through which combustion gas flows, a plurality of nozzles which form a flame in the cylinder, and a plurality of swirling vanes provided around the nozzle. High-temperature and high-pressure combustion gas is generated in the cylinder by the flame formed by the nozzles. Incidentally, in some cases, a phenomenon called flashback may occur inside the combustor in the course of the flow of fuel and air. Flashback is a phenomenon in which flames propagate to unexpected regions in the combustor, thereby causing abnormal combustion. In particular, since the flow velocity and the pressure in a central region (vortex core) of the swirling flow formed by the swirling vanes are lower than those in other regions, it is known that flashback is likely to occur there. In order to avoid such flashback, for example, in a device described in Japanese Unexamined Patent Application, First Publication No. 2015-183892 described below, by forming an air flow path for supplying air to the vortex core from a distal end of the nozzles, the flow velocity of the fluid in the vortex core increases. Air is guided into the air flow path from a position on an upstream side of the swirling vanes (pressure loss portions) in the nozzle. Therefore, flashback can be avoided However, in the device of Japanese Unexamined Patent Application, First Publication No. 2015-183892, a driving force of the air to be supplied to the air flow path is only a pressure difference in upstream and downstream directions of the swirling vanes. For this reason, there is a likelihood that a sufficient pressure difference may not be obtained depending on an output band of the gas turbine. That is, there is still a likelihood that a sufficient amount of air may not be supplied to the air flow path and flashback may occur.

The present invention has been made to solve the aforementioned problems, and an object thereof is to provide a gas turbine combustor and a gas turbine in which the likelihood of occurrence of flashback is further reduced.

Solution to Problem

According to a first aspect of the present invention, a gas turbine combustor including: a nozzle in which an air ejection passage extending along an axis and having an open distal end, and a fuel supply passage extending along the axis and having an open distal end are formed; swirling vanes provided around the nozzle so as to be twisted around the axis of the nozzle; an inner cylinder surrounding an outer periphery of the nozzle and the swirling vanes and in which compressed air flows through an inside of the inner cylinder toward a downstream side; an outer cylinder configured to define an inversion flow path, which inverts the compressed air on an outer periphery of the inner cylinder and introduces the compressed air to the inside of the inner cylinder, between the outer cylinder and the inner cylinder; and an air introduction pipe having one end connected to a space on an upstream side of the compressed air from the inversion flow path, and the other end connected to the air ejection passage.

According to this configuration, the compressed air of the space on the upstream side of the inversion flow path is guided to the air ejection passage by the air introduction pipe. Here, since a pressure loss caused by the inversion flow path and the swirling vane occurs, the pressure in the space inside the inner cylinder is sufficiently smaller than the pressure of the space on the upstream side of the inversion flow path. That is, a sufficient pressure difference can be obtained between one end of the air introduction pipe and the other end. Therefore, a sufficient amount of compressed air can be supplied to the air ejection passage.

According to a second aspect of the present invention, one end of the air ejection passage may be open at a distal end of the nozzle.

According to this configuration, since one end of the air ejection passage is open to the distal end of the nozzle, sufficient compressed air is supplied to the vortex core of the swirling flow generated near the distal end of the nozzle. Therefore, the flow velocity of the fluid in the vortex core can be increased.

According to the third aspect of the present invention, the gas turbine combustor may have a rectifying plate provided on the upstream side of the inversion flow path to rectify the flow of the compressed air and make the compressed air to generate a pressure loss thereon.

According to this configuration, it is possible to further increase the pressure difference between the space inside the inner cylinder and the space on the upstream side of the inversion flow path, by the pressure loss caused by the rectifying plate. Therefore, the flow velocity of the air to be ejected from the air ejection passage can be further increased.

According to a fourth aspect of the present invention, the gas turbine combustor further including a plurality of nozzles, wherein the air introduction pipe may have a main introduction pipe having one end connected to the space on the upstream side, and a manifold portion having one end connected to the main introduction pipe and the other end branching toward the plurality of nozzles.

According to this configuration, the compressed air guided from the main introduction pipe can be supplied to the plurality of nozzles by the manifold portion. That is, since there is no need to provide a main introduction pipe for each of the nozzles, it is possible to reduce the scale of processing and repairs to be performed on the outer cylinder. Therefore, it is possible to shorten the construction period and reduce costs.

According to a fifth aspect of the present invention, there is provided a gas turbine including: a compressor which is configured to compress external air to generate compressed air; the gas turbine combustor according to any one of first to fourth aspects which is configured to burn the compressed air and fuel to generate a combustion gas; and a turbine driven by the combustion gas.

According to this configuration, it is possible to provide a gas turbine that can operate more stably, by reducing the likelihood that flashback will occur in the combustor.

Advantageous Effects of Invention

According to the present invention, it is possible to provide a gas turbine combustor and a gas turbine in which the likelihood of occurrence of flashback is further reduced.

DESCRIPTION OF EMBODIMENTS

Figure 1:
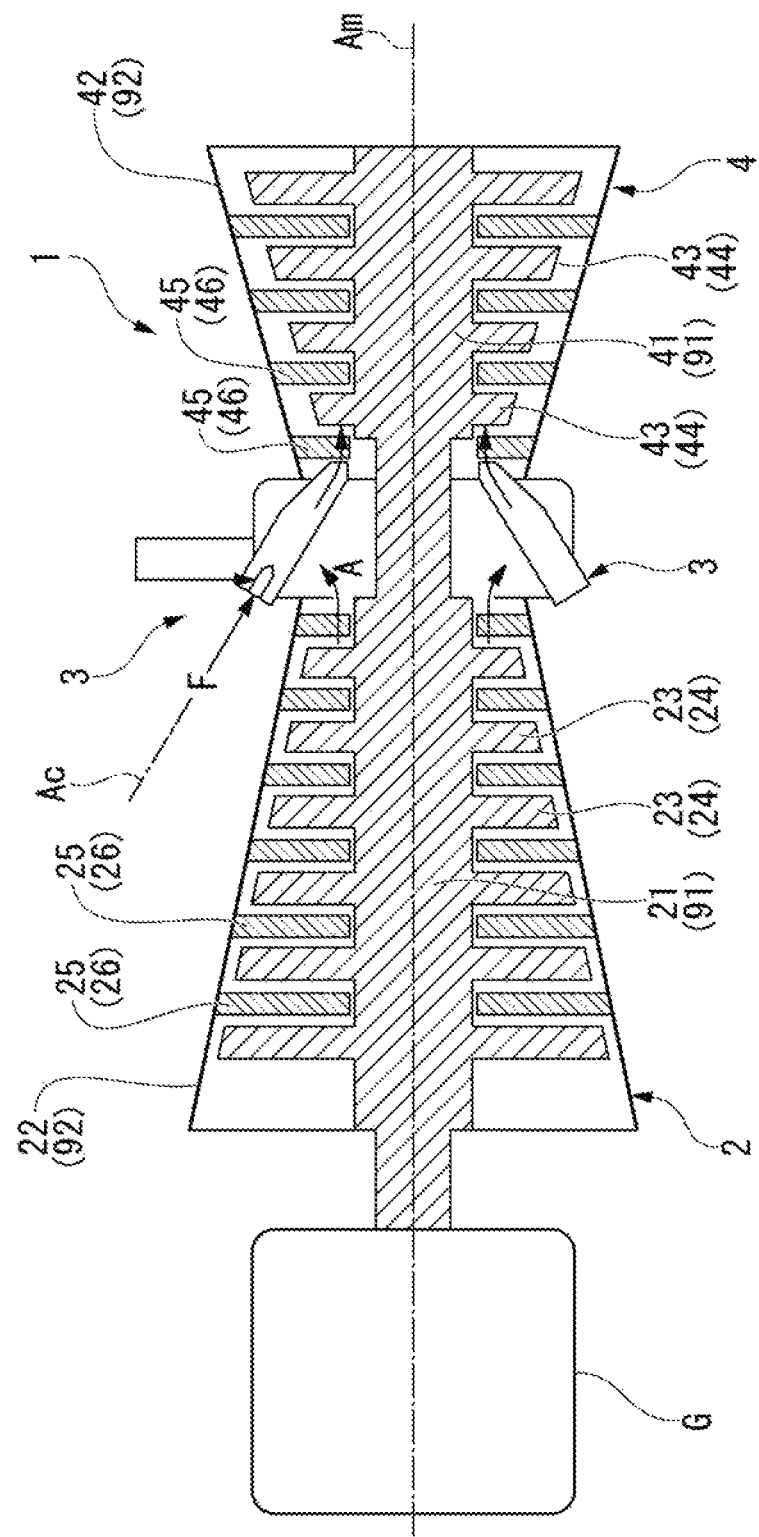
FIG. 1 is a schematic diagram showing a configuration of a gas turbine according to a first embodiment of the present invention.

An embodiment of the present invention will be described with reference to the drawings. As shown in FIG. 1, a gas turbine 1 according to the present embodiment is equipped with a compressor 2 that generates compressed air, a combustor 3 (a gas turbine combustor 3) which generates a combustion gas by mixing and burning compressed air A and fuel F, and a turbine 4 driven by the combustion gas.

The compressor 2 has a compressor rotor 21 extending along a main axis Am, and a compressor casing 22 that covers the compressor rotor 21 from an outer peripheral side. The compressor rotor 21 is rotatably supported around the main axis Am. A plurality of compressor rotor blade rows 23 arranged at intervals in a direction of the main axis Am are provided on an outer peripheral surface of the compressor rotor 21. Each compressor rotor blade row 23 has a plurality of compressor rotor blades 24 arranged at intervals in a circumferential direction of the main axis Am.

The compressor casing 22 has a cylindrical shape centered on the main axis Am. On an inner peripheral surface of the compressor casing 22, a plurality of compressor stator vane rows 25 arranged to be staggered with the aforementioned compressor rotor blade row 23 in the direction of the main axis Am are provided. Each compressor stator vane row 25 has a plurality of compressor stator vanes 26 arranged on the inner peripheral surface of the compressor casing 22 at intervals in the circumferential direction of the main axis Am.

The combustor 3 is provided between the compressor casing 22 and a turbine casing 42 to be described later. The combustor 3 communicates with the inside of the compressor casing 22. Therefore, the compressed air generated by the compressor 2 is guided into the combustor 3. As will be described in detail later, high-temperature and high-pressure combustion gas is generated in the combustor 3, by the combustion of the mixture of compressed air and the fuel.

The turbine 4 has a turbine rotor 41 extending along the main axis Am, and a turbine casing 42 that covers the turbine rotor 41 from the outer peripheral side. A plurality of turbine rotor blade rows 43 arranged at intervals in the direction of the main axis Am are provided on the outer peripheral surface of the turbine rotor 41. Each turbine rotor blade row 43 has a plurality of turbine rotor blades 44 arranged at intervals in the circumferential direction of the main axis Am.

The turbine casing 42 has a cylindrical shape centered on the main axis Am. A plurality of turbine stator vane rows 45 arranged to be staggered with the aforementioned turbine rotor blade row 43 in the direction of the main axis Am are provided on the inner peripheral surface of the turbine casing 42. Each turbine stator vane row 45 has a plurality of turbine stator vanes 46 arranged on the inner peripheral surface of the turbine casing 42 at intervals in the circumferential direction of the main axis Am.

The compressor rotor 21 and the turbine rotor 41 are integrally connected on the main axis Am to form a gas turbine rotor 91. Similarly, the compressor casing 22 and the turbine casing 42 are integrally connected to each other in the direction of the main axis Am to form a gas turbine casing 92. The gas turbine rotor 91 rotates integrally about the main axis Am inside the gas turbine casing 92 (a compartment V). As an example, a generator G that generates power with rotation of the gas turbine rotor 91 is connected to one end of the gas turbine rotor 91.

Figure 2:
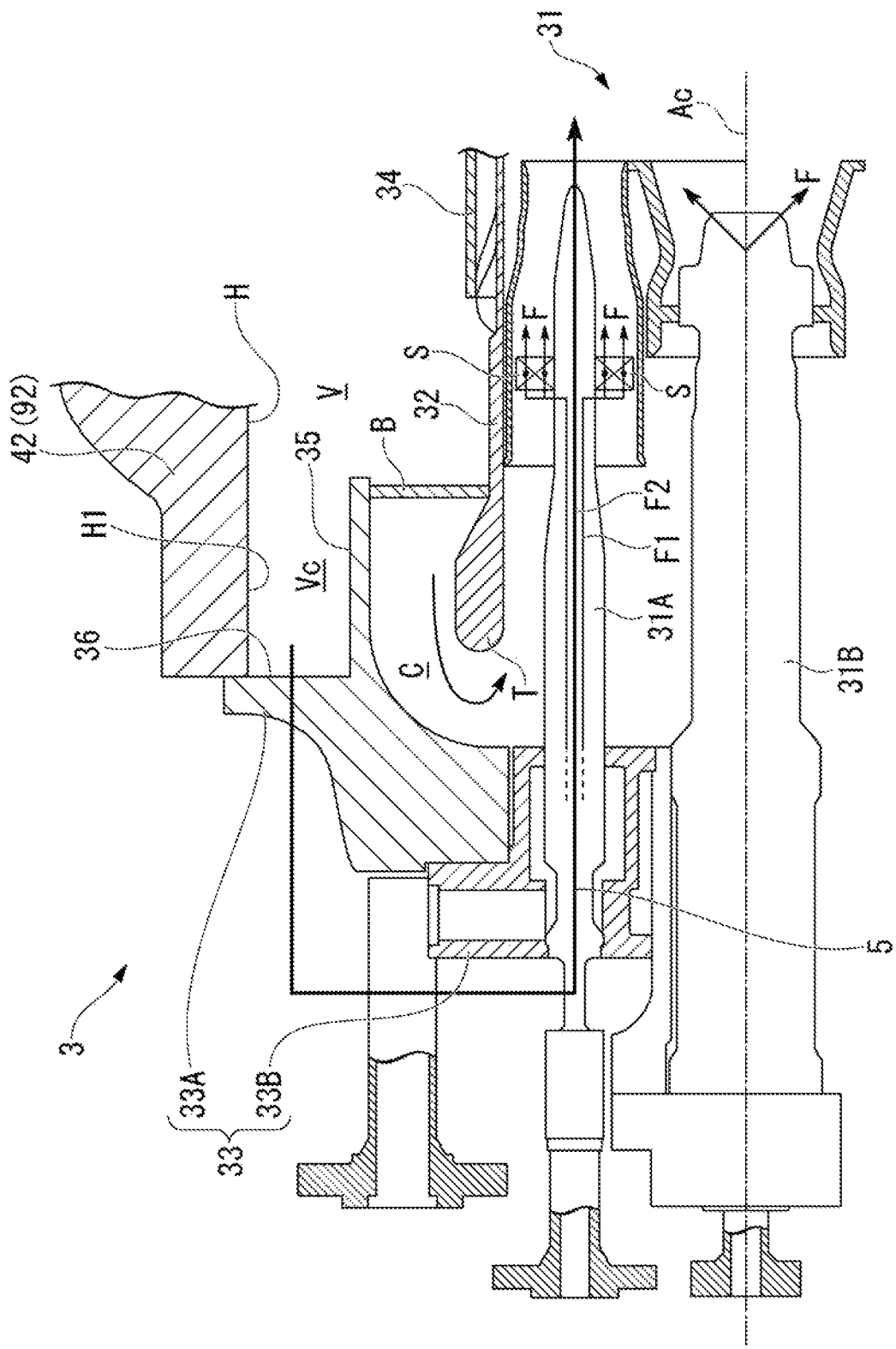
FIG. 2 is an enlarged cross-sectional view of a main part of a combustor according to the first embodiment of the present invention.

Next, a detailed configuration of the first embodiment of the combustor 3 will be described. As shown in FIG. 1, the combustor 3 according to the present embodiment has a cylindrical shape centered on a combustor axis Ac (an axis) extending in a direction intersecting with the main axis Am. Further, as shown in FIG. 2, the combustor 3 is equipped with a fuel nozzle 31 which injects fuel, a cylindrical inner cylinder 32 which houses the fuel nozzle 31, an outer cylinder 33 connected to an upstream side of the inner cylinder 32, and a tail pipe 34 connected to a downstream side of the inner cylinder 32.

The fuel nozzle 31 injects the fuel supplied from a fuel supply source toward the inside of the inner cylinder 32. As shown in FIG. 2, the fuel nozzle 31 has a first nozzle 31A (nozzle) for forming a premixed combustion flame, and a second nozzle 31B for igniting fuel to be injected from the first nozzle 31A. The single second nozzle 31B is provided along the combustor axis Ac. A plurality of first nozzles 31A are arranged at intervals in the circumferential direction of the combustor axis Ac.

The second nozzle 31B ignites the premixed gas injected from the first nozzle 31A by forming a diffusion combustion flame. With formation of the premixed combustion flame provided by the first nozzle 31A, high-temperature and high-pressure combustion gas is generated in the inner cylinder 32 and the tail pipe 34.

The inner cylinder 32 surrounds an outer periphery of the fuel nozzle 31 (the plurality of first nozzles 31A and the second nozzle 31B) disposed around of the combustor axis Ac. Specifically, the fuel nozzle 31 is provided in a region inside the inner cylinder 32 on one side in the direction of the combustor axis Ac. The inner cylinder 32 has a circular tubular shape centered on the combustor axis Ac. An upstream side end portion of the inner cylinder 32 is a thick portion T having a thickness (a dimension of the combustor axis Ac in the radial direction) set to be greater than other portions. The thick portion T faces an outer cylinder 33 to be described below with a gap therebetween.

The outer cylinder 33 is a bottomed cylindrical member provided to close a combustor insertion hole H formed in the compartment V. The outer cylinder 33 has a substantially cylindrical outer cylinder main body 33A, and a nozzle base 33B that supports the second nozzle 31B and the first nozzle 31A.

A portion of the inner peripheral surface of the outer cylinder main body 33A, including an end portion on one side in the direction of the combustor axis Ac, is curved in a curved surface shape to be directed from an inner side to an outer side in a radial direction, from one side to the other side in the direction of the combustor axis Ac. This portion defines an inversion flow path C by facing the thick portion T of the aforementioned inner cylinder 32. The compressed air in the compartment V flows into the inversion flow path C. The compressed air changes direction when passing through the inversion flow path C, and flows inside the inner cylinder 32 from one side to the other side in the direction of the combustor axis Ac. In the following description, aside from which the compressed air flows is referred to as an upstream side, and a side to which the compressed air flows is referred to as a downstream side. A rectifying plate B is provided in a portion on the upstream side of the inversion flow path C (on the side of the compartment V). Although not shown in detail, the rectifying plate B has a plurality of plate members arranged at intervals. The rectifying plate B rectifies the flow of the compressed air and generates a pressure loss from the upstream side to the downstream side. That is, the pressure is lower in the inversion flow path C, which is the downstream side of the rectifying plate B, than in the compartment V which is the upstream side.

An outer peripheral surface 35 (a surface facing radially outward with respect to the combustor axis Ac) of the outer cylinder main body 33A faces the inner peripheral surface H1 of the above-described combustor insertion hole H via a gap Vc that extends in the radial direction with respect to the combustor axis Ac. The gap Vc is a space formed by the inner peripheral surface H1 of the combustor insertion hole H, the outer peripheral surface 35 of the outer cylinder main body 33A, and a surface (the downstream surface 36) facing the downstream side of the outer cylinder main body 33A. That is, the gap Vc has an annular shape centered on the combustor axis Ac. The gap Vc communicates with the aforementioned compartment V. Therefore, the pressure in the gap Vc is equal to the pressure in the compartment V. In other words, the pressure of the compressed air in the gap Vc is higher than the pressure of the compressed air in the inversion flow path C. That is, in the direction in which the compressed air flows, the gap Vc is on the upstream side of the inversion flow path C, like the compartment V.

The nozzle base 33B is a member formed in a substantially disk shape centered on the combustor axis Ac. One second nozzle 31B is inserted through a region including the center point of the nozzle base 33B. Further, on the outer peripheral side of the second nozzle 31B, a plurality of first nozzles 31A are arranged at intervals in the circumferential direction of the combustor axis Ac. The first nozzle 31A has a substantially tubular shape, and has a fuel supply passage F1 and an air ejection passage F2 formed therein. A plurality of swirling vanes S are provided around the first nozzle 31A. Each swirling vane S is twisted around the central axis of the first nozzle 31A from one side to the other side in the direction of the combustor axis Ac. The central axis of the first nozzle 31A is an axis extending parallel to the combustor axis Ac. Thus, a swirling flow component is added to the fluid that has passed around the swirling vane S.

A distal end of the fuel supply passage F1 is open to the surface of each swirling vane S. That is, the fuel supplied through the fuel supply passage F1 is mixed with the compressed air on the surface of the swirling vane S. The aforementioned premixed combustion flame is formed on the downstream side of the first nozzle 31A by combustion of the air-fuel mixture.

A distal end (first end) of the air ejection passage F2 is open to the distal end (end portion on the downstream side) of the first nozzle 31A. An air introduction pipe 5 is connected to the second end of the air ejection passage F2. The air introduction pipe 5 is a pipe that connects the aforementioned gap Vc and the air ejection passage F2. The air introduction pipe 5 extends from the gap Vc toward the outside of the outer cylinder 33, and is connected to the air ejection passage F2 to penetrate the nozzle base 33B. In the present embodiment, a single air introduction pipe 5 is connected to each first nozzle 31A. That is, the plurality of air introduction pipes 5 extending from the gap Vc are connected to each first nozzle 31A one by one.

Next, operations of the gas turbine 1 and the combustor 3 according to the present embodiment will be described. When operating the gas turbine 1, first, the compressor rotor 21 (the gas turbine rotor 91) is rotationally driven by an external drive source. External air is sequentially compressed with the rotation of the compressor rotor 21 and thereby generating compressed air. The compressed air is supplied into the combustor 3 through a space in the compressor casing 22. In the combustor 3, the fuel supplied from the fuel nozzle 31 is mixed with the compressed air and burned, and thereby generating high-temperature and high-pressure combustion gas. The combustion gas is supplied to the turbine 4 through a space inside the turbine casing 42. In the turbine 4, a rotational driving force is imparted to the turbine rotor 41 (the gas turbine rotor 91) by the combustion gas sequentially colliding with the turbine rotor blades 44 and the turbine stator vanes 46. The rotational energy is used to drive a generator G connected to a shaft end.

Next, a detailed operation of the combustor 3 will be described. The compressed air generated by the compressor 2 is supplied from the compartment V into the inner cylinder 32 through the rectifying plate B and the inversion flow path C. When the compressed air passes through the rectifying plate B and the inversion flow path C, a pressure loss occurs therein. The compressed air introduced into the inner cylinder 32 is mixed with the fuel injected from the first nozzle 31A to form a premixed gas. The premixed gas is ignited by the diffusion combustion flame injected from the second nozzle 31B to form a premixed combustion flame. The premixed combustion flame extends from the upstream side to the downstream side in the inner cylinder 32, and generates high-temperature and high-pressure combustion gas. The combustion gas flows inside the tail pipe 34 from one side to the other side in the direction of the combustor axis Ac, and is then introduced into the turbine casing 42 to drive the turbine 4.

Here, since the swirling vanes S are provided around the first nozzle 31A, the swirling flow component is contained in the premixed combustion flame. That is, the premixed combustion flame propagates, while turning about the first nozzle 31A from one side to the other side in the direction of the combustor axis Ac. Accordingly, a vortex core of the swirling flow is formed on the other end of the distal side of the first nozzle 31A in the direction of the combustor axis Ac. It is known that flashback is likely to occur in the vortex core because the flow velocity and pressure are lower than those in other regions. Flashback is a phenomenon in which abnormal combustion is caused by propagation of flames to fuel remaining in unexpected regions inside the combustor 3.

In order to avoid such flashback, in the present embodiment, the aforementioned air ejection passage F2 is formed in the first nozzle 31A. The compressed air in the compartment V (gap Vc) is supplied to the air ejection passage F2 via the air introduction pipe 5. Since the distal end of the air ejection passage F2 is open to the downstream side end portion of the first nozzle 31A, high-pressure compressed air is supplied toward the vortex core. Therefore, the flow velocity and pressure of the fluid in the vortex core can be increased.

As described above, in the combustor 3 according to the present embodiment, the compressed air of the space (gap Vc) on the upstream side of the inversion flow path C is guided to the air ejection passage F2 by the air introduction pipe 5. Here, since the pressure loss caused by the inversion flow path C and the swirling vane S occurs, the pressure in the space inside the inner cylinder 32 is sufficiently smaller than the pressure in the gap Vc. That is, a sufficient pressure difference can be obtained between one end of the air introduction pipe 5 and the other end. Therefore, a sufficient amount of compressed air can be supplied to the air ejection passage F2.

Further, according to the aforementioned configuration, since one end of the air ejection passage F2 is open to the distal end of the nozzle, sufficient compressed air is supplied to the vortex core of the swirling flow generated near the distal end of the nozzle. Therefore, the flow velocity of the fluid in the vortex core can be increased.

In addition, according to the aforementioned configuration, it is possible to further increase the pressure difference between the space inside the inner cylinder 32 and the gap Vc, which is the space on the upstream side of the inversion flow path C, by the pressure loss caused by the rectifying plate B. Therefore, the flow velocity of the air to be ejected from the air ejection passage F2 can be further increased.

Figure 3:
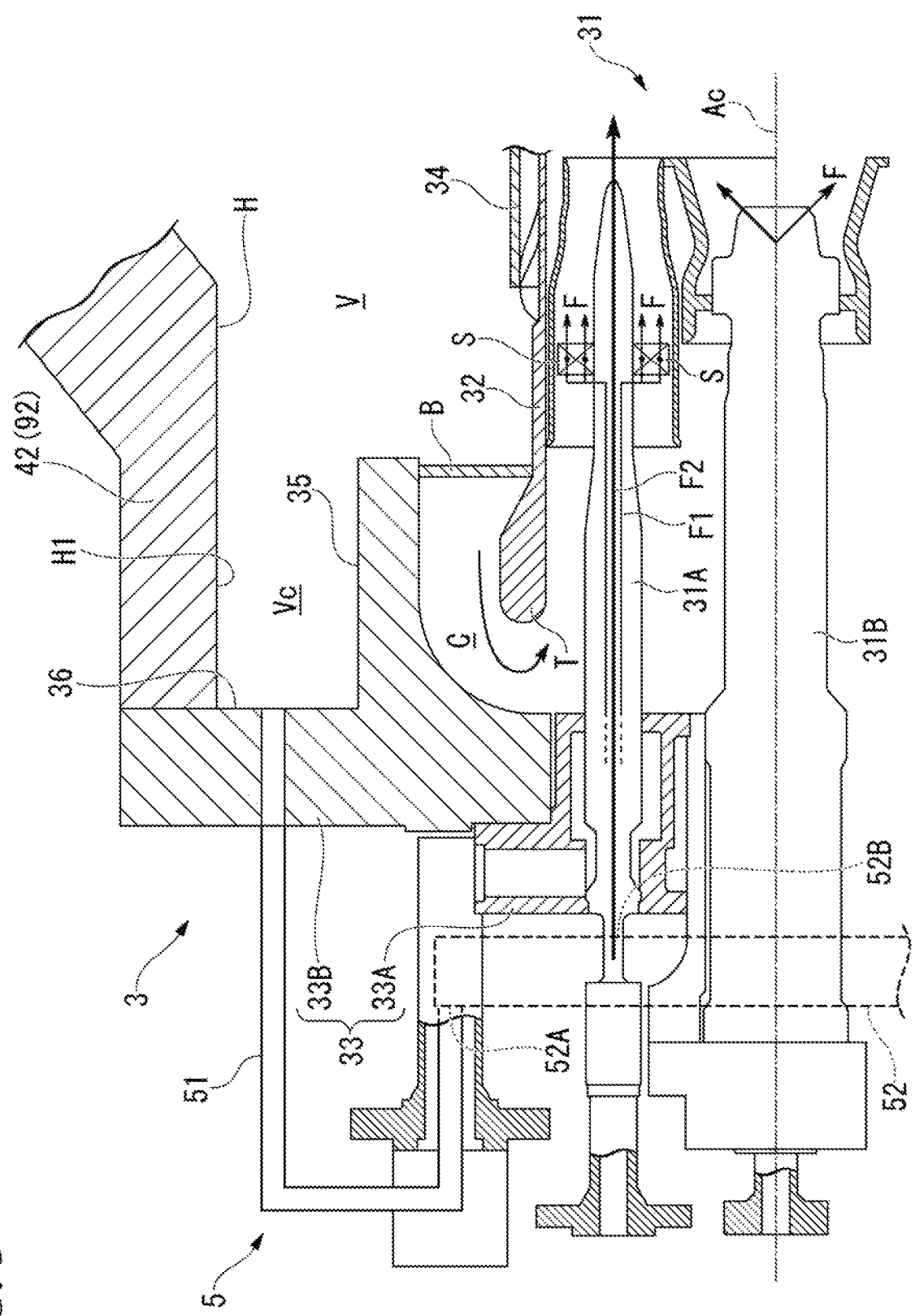
FIG. 3 is an enlarged cross-sectional view of a main part of a combustor according to a second embodiment of the present invention.

Next, a second embodiment of the combustor 3 will be described with reference to FIG. 3. Constituents the same as those in the first embodiment are denoted by the same reference numerals, and detailed description thereof will not be provided. As shown in FIG. 3, in the present embodiment, the air introduction pipe 5 has a main introduction pipe 51, and a manifold portion 52 connected to the main introduction pipe 51. One end of the main introduction pipe 51 is connected to the gap Vc. The other end of the main introduction pipe 51 is connected to the manifold portion 52. The manifold portion 52 divides the compressed air guided through the main introduction pipe 51 toward the plurality of first nozzles 31A. That is, only one inlet port 52A and a plurality of discharge ports 52B each communicating with the inlet port 52A are formed in the manifold portion 52. The number of the discharge ports 528 is the same as the number of the first nozzles 31A in the combustor 3. An air ejection passage F2 formed in the first nozzle 31A is connected to each discharge port 52B.

According to the aforementioned configuration, the air introduction pipe 5 has the main introduction pipe 51 and the manifold portion 52. Thus, the compressed air guided from the gap Vc through the main introduction pipe 51 can be dispersed and supplied to the plurality of first nozzles 31A by the manifold portion 52. That is, since there is no need to provide the main introduction pipe 51 for each of the first nozzles 31A, it is possible to reduce the scale of the processing or repairs to be performed on the outer cylinder 33. Therefore, it is possible to shorten the construction period and reduce costs.

The embodiments of the present invention have been described with reference to the drawings. Various changes and modifications can be made to the aforementioned configuration without departing from the spirit of the present invention. For example, the configuration in which the air ejection passage F2 is provided only in the first nozzle 31A has been described in the aforementioned embodiment. However, the air ejection passage F2 may be provided in the second nozzle 318. Also in this case, similarly to the first nozzle 31A, the air ejection passage F2 can be provided, by forming a flow path that penetrates the inside of the second nozzle 31B and opens at the downstream side end portion of the second nozzle 31B. Further, it is also possible to form the air ejection passage F2 only in the second nozzle 31B.

Further, the configuration in which the swirling vane S is attached to the first nozzle 31A has been described in each of the aforementioned embodiments. However, the aspect of the swirling vane S is not limited to the aforementioned embodiments, and it is possible to adopt a configuration in which the swirling vane S is attached to the inner peripheral surface of the inner cylinder 32 that covers the first nozzle 31A.

INDUSTRIAL APPLICABILITY

According to the gas turbine combustor, the compressed air of the space on the upstream side of the inversion flow path is guided to the air ejection passage by the air introduction pipe. Here, since pressure loss caused by the inversion flow path and the swirling vane occurs, the pressure of the space inside the inner cylinder is sufficiently smaller than the pressure of the space on the upstream side of the inversion flow path. That is, a sufficient pressure difference can be obtained between one end of the air introduction pipe and the other end. Therefore, a sufficient amount of compressed air can be supplied to the air ejection passage.

REFERENCE SIGNS LIST

1 Gas turbine
2 Compressor
3 Combustor
4 Turbine
5 Air introduction pipe
21 Compressor rotor
22 Compressor casing
23 Compressor rotor blade row
24 Compressor rotor blade
25 Compressor stator vane row
26 Compressor stator vane
31 Fuel nozzle
31A First nozzle
31B Second nozzle
32 Inner cylinder
33 Outer cylinder
33A Outer cylinder main body
33B Nozzle base
34 Tail pipe
35 Outer peripheral surface
36 Downstream surface
41 Turbine rotor
42 Turbine casing
43 Turbine rotor blade row
44 Turbine rotor blade
45 Turbine stator vane row
46 Turbine stator vane
51 Main introduction pipe
52 Manifold portion
52A Inlet port
52B Discharge port
91 Gas turbine rotor
92 Gas turbine casing
Am Main axis
Ac Combustor axis
B Rectifying plate
C Inversion flow path
F1 Fuel supply passage
F2 Air ejection passage
G Generator
H Combustor insertion hole
H1 Inner peripheral surface
S Swirling vane
T Thick portion
V Compartment
Vc Gap

The invention claimed is:

1. A gas turbine combustor comprising:
a nozzle in which is formed an air ejection passage extending along an axis of the nozzle inside the nozzle and having an open distal end, and the nozzle further having formed therein a fuel supply passage extending along the axis of the nozzle and having an open distal end;
swirling vanes provided around the nozzle so as to be twisted around the axis of the nozzle;
an inner cylinder surrounding an outer periphery of the nozzle and the swirling vanes, and in which compressed air flows through an inside of the inner cylinder toward a downstream side;
an outer cylinder configured to define an inversion flow path configured to invert the compressed air on an outer periphery of the inner cylinder and to introduce the compressed air to the inside of the inner cylinder, between the inner cylinder and the outer cylinder;
an air introduction pipe having a first end connected to a first space on an upstream side of the inversion flow path with respect to a direction of flow of the compressed air, and a second end connected to the air ejection passage, and
a rectifying plate at a first end of the inversion flow path on an upstream side of the inversion flow path to rectify the flow of the compressed air and make the compressed air generate a pressure loss thereon,
wherein the first space to which the first end of the air introduction pipe is connected is located on the upstream side of the rectifying plate with respect to the direction of flow of the compressed air,
wherein the first end of the air introduction pipe is connected to the first space so as to be separate from and not communicate with the inversion flow path, and
a second end of the inversion flow path is connected to a second space located between the nozzle and the inner cylinder around the axis of the nozzle.

2. The gas turbine combustor according to claim 1, wherein the open distal end of the air ejection passage is open at a distal end of the nozzle.

3. The gas turbine combustor according to claim 1, further comprising a plurality of nozzles, wherein the air introduction pipe has a main introduction pipe having a first end connected to the first space on the upstream side of the inversion flow path, and a manifold portion having a first end connected to a second end of the main introduction pipe and having a second end branching toward the plurality of nozzles.

4. A gas turbine comprising:
a compressor configured to compress external air to generate compressed air;
the gas turbine combustor according to claim 1 which is configured to burn the compressed air and fuel to generate a combustion gas; and
a turbine driven by the combustion gas.

5. The gas turbine combustor according to claim 1, wherein the gas turbine combustor is centered on a combustor axis, the axis of the nozzle extending along the combustor axis the first space being a gap formed between the outer cylinder and a gas turbine casing with respect to a radial direction, the gap having an annular shape centered on the combustor axis of the gas turbine combustor and communicating with a compartment inside the gas turbine casing.

6. A gas turbine combustor comprising:
a plurality of nozzles, each of the nozzles having therein an air ejection passage extending along an axis of the respective nozzle and having an open distal end, and each of the nozzles further having therein a fuel supply passage extending along the axis of the respective nozzle and having an open distal end;
swirling vanes provided around each of the nozzles so as to be twisted around the axis of the respective one of the nozzles;
an inner cylinder surrounding an outer periphery of the nozzles and the swirling vanes and in which compressed air flows through an inside of the inner cylinder toward a downstream side;
an outer cylinder configured to define an inversion flow path configured to invert the compressed air on an outer periphery of the inner cylinder and introduce the compressed air to the inside of the inner cylinder, between the outer cylinder and the inner cylinder;
an air introduction pipe having a first end connected to a space on an upstream side of the compressed air from the inversion flow path, and having a second end connected to the air ejection passage, and
a rectifying plate on an upstream side of the inversion flow path to rectify the flow of the compressed air and make the compressed air generate a pressure loss thereon,
wherein the space to which the first end of the air introduction pipe is connected is located on the upstream side of the rectifying plate, and
the air introduction pipe has a main introduction pipe having a first end connected to the space on the upstream side of the compressed air, and a manifold portion having a first end connected to a second end of the main introduction pipe and having a second end branching toward the plurality of nozzles.

7. The gas turbine combustor according to claim 6, wherein a first end of the air ejection passage of each of the nozzles is open at a distal end of the nozzle.

8. A gas turbine comprising:
a compressor configured to compress external air to generate compressed air;
the gas turbine combustor according to claim 6 which is configured to burn the compressed air and fuel to generate a combustion gas; and
a turbine driven by the combustion gas.

9. The gas turbine combustor according to claim 6, wherein the space is a gap formed between the outer cylinder and a gas turbine casing, the gap having an annular shape centered on an axis of the gas turbine combustor and communicating with a compartment inside the gas turbine casing.

* * * * *